(12) United States Patent
Matsumoto

(10) Patent No.: US 6,215,753 B1
(45) Date of Patent: Apr. 10, 2001

(54) RECORDING-MEDIUM LOADING APPARATUS HAVING A RECORDING MEDIUM HOLDER MOVABLE RELATIVE TO A TRAY

(75) Inventor: Kenji Matsumoto, Hoya (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 09/236,251

(22) Filed: Jan. 25, 1999

(30) Foreign Application Priority Data

Jan. 26, 1998 (JP) .................................................. 10-012708

(51) Int. Cl.⁷ .................................................. G11B 33/02
(52) U.S. Cl. .............................................................. 369/77.2
(58) Field of Search ................................. 369/75.1, 75.2, 369/77.1, 77.2

(56) References Cited

U.S. PATENT DOCUMENTS

| | | | |
|---|---|---|---|
| 4,811,323 | * 3/1989 | d'Arc et al. | 369/75.2 |
| 4,918,551 | * 4/1990 | Yoshida et al. | 360/96.5 |
| 5,357,385 | * 10/1994 | Shimizu et al. | 360/96.5 |
| 5,610,890 | * 3/1997 | Eum et al. | 369/77.2 |
| 5,621,713 | * 4/1997 | Sato et al. | 369/75.2 |
| 5,963,528 | * 10/1999 | Fujimura et al. | 369/77.1 |

* cited by examiner

Primary Examiner—William R. Korzuch
Assistant Examiner—Franklin D. Altman
(74) Attorney, Agent, or Firm—Anderson, Kill & Olick, P.C.

(57) ABSTRACT

In a recording-medium loading apparatus, a recording medium can be smoothly attached to a tray without inconvenient operations. The recording-medium loading apparatus has a reduced thickness. A tray is movable between an exchanging position at which the recording medium is removed or inserted and a loaded position at which a recording or reproducing operation is performed on the recording medium. The recording medium is inserted into a holder. The holder is supported by a support member so that the holder is movable between an accommodating position at which the holder is accommodated in the tray and an insertion/ejection position at which the holder is separated from the tray. The holder is movable to the insertion/ejection position when the tray is moved to the exchanging position, and the holder is held at the accommodating position during a process for moving the tray to the loaded position.

7 Claims, 22 Drawing Sheets

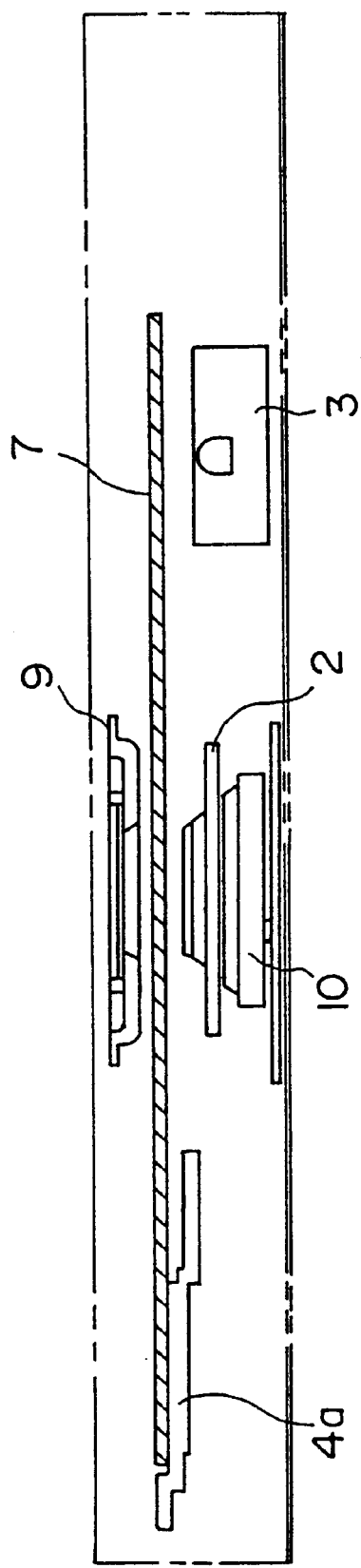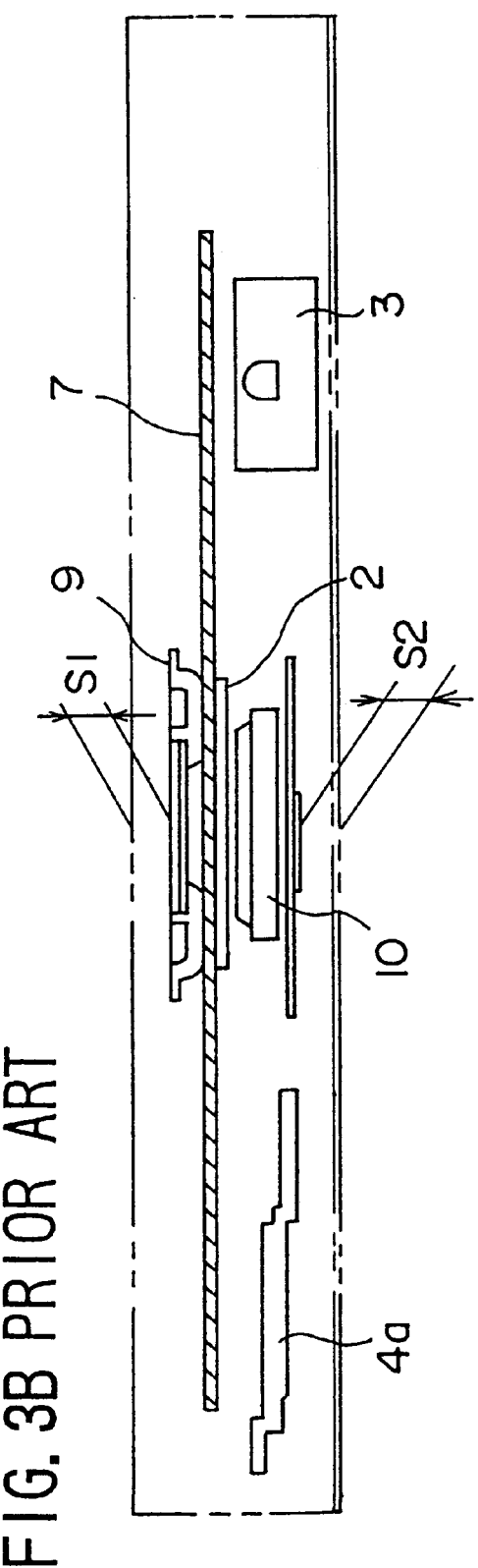
FIG. 3A PRIOR ART
FIG. 3B PRIOR ART

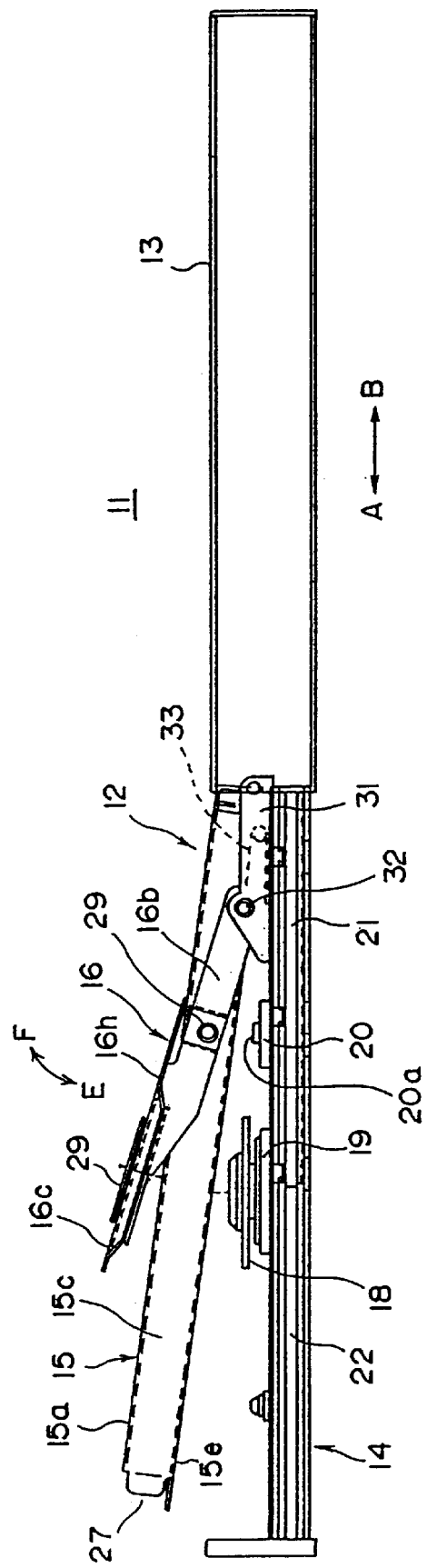

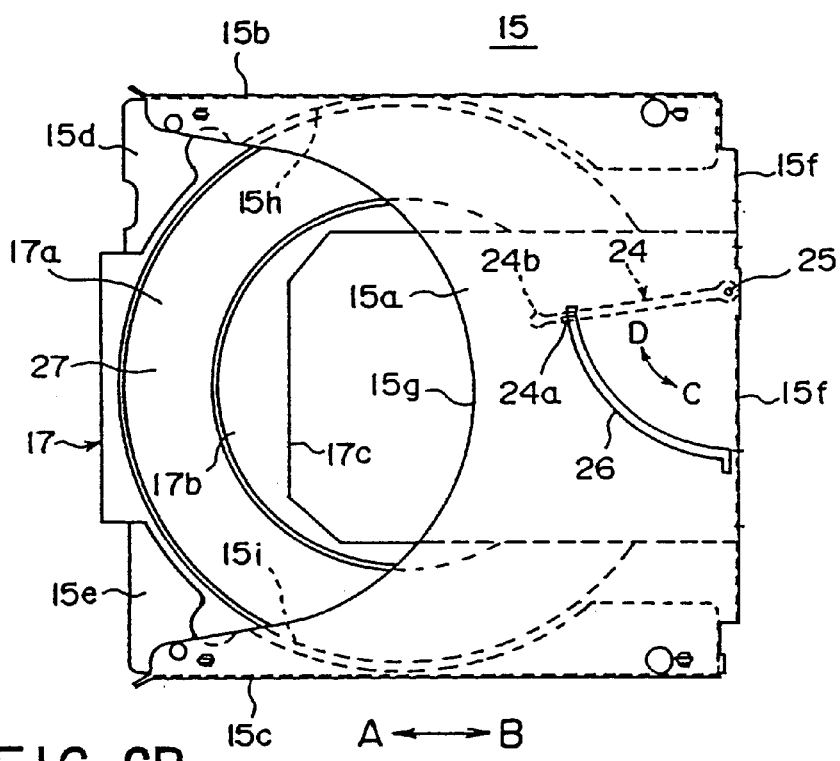
FIG. 6A
FIG. 6C
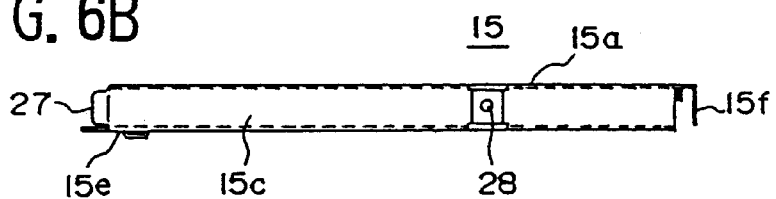
FIG. 6B

RECORDING-MEDIUM LOADING APPARATUS HAVING A RECORDING MEDIUM HOLDER MOVABLE RELATIVE TO A TRAY

BACKGROUND OF THE INVENTION

1. Field of the Invention

The present invention relates to a recording-medium loading apparatus and, more particularly, to a recording-medium loading apparatus to which a recording medium can be attached by a smooth operation.

2. Description of the Related Art

As a recording medium for recording information such as a database or software, a disc-like recording medium reproduced by a laser pickup of an optical disc apparatus is used. Optical discs on the market are classified into the following three types.

1) A "read only type" disc such as a CD (compact disc) or a CD-ROM which is exclusive for reading information recorded on the disc.
2) A "writable type" disc such as a recordable disc (CD-R) which is writable only once.
3) A "rewritable type" disc such as a phase change disc (PD, CD-RW) which can be rewritten many times.

A conventional optical disc apparatus is exclusive for each of the discs of the above-mentioned types 1) to 3). Accordingly, if one uses different types of discs, a plurality of optical disc apparatus are needed. In order to eliminate such inconvenience, a disc apparatus in which different types of optical discs can be attached on the same tray has been developed. As such a conventional disc apparatus to which different discs can be loaded, there is an apparatus in which a CD-ROM and a disc cartridge in which a PD is accommodated can be attached on the same tray.

FIG. 1 is a perspective view of a conventional apparatus to which a CD-ROM or a disc cartridge can be loaded.

As shown in FIG. 1, a turntable 2 on which a disc is clamped and an optical pickup 3 are provided on a chassis 1. A tray 4 is slidably provided on the chassis 1. A CD-ROM or a disc cartridge (not shown in the figure) is placed on the tray 4. The tray 4 has a dual structure which comprises an inner tray 4a on which the CD-ROM is placed and an outer tray 4b on which the disc cartridge is placed. The inner tray 4a is provided inside the outer tray 4b so that the inner tray 4a is movable up and down relative to the outer tray 4b.

When loading the disc cartridge, the disc cartridge is placed on the inner tray 4a. At this time, the inner tray 4a serves as a placing part. Since the disc cartridge is inserted inside the outer tray 4b without a play therebetween, a notch 4c is provided on a front side of the inner tray 4a. When the disc cartridge is removed from the tray 4, a front side of the disc cartridge is lifted from the inner tray 4a by inserting a finger into the notch 4c from under side of the tray 4. Then, the part of the disc cartridge upwardly protruding from the tray 4 is held so as to remove the disc cartridge from the outer tray 4b.

The inner tray 4a comprises a small diameter disc placing part 4a1 on which a disc having a diameter of 8 cm is placed and a large diameter disc placing part 4a2 on which a disc having a diameter of 12 cm is placed. The inner tray 4a is normally located at a position at which the CD-ROM is supported. However, the inner tray 4a is mounted so at to be moved downwardly when the disc cartridge is attached.

A support plate 5 is mounted above the tray 4 so that the support plate 5 covers a space above the chassis 1. A shutter opening lever 6 is supported on a bottom surface of the support plate 5 so a to open a shutter of the disc cartridge.

In the conventional apparatus as constructed above, when removing the cartridge, there is a problem in that an operation for removing the cartridge is inconvenient since the cartridge must be lifted by inserting a finger into the notch 4c from under side of the tray 4.

FIGS. 2A and 2B are cross-sectional views of the conventional apparatus for showing an interior of the apparatus when a disc cartridge is loaded. FIGS. 3A and 3B are cross-sectional views of the conventional apparatus for showing an interior of the apparatus when a disc is loaded.

As shown in FIGS. 2A and 2B, in the conventional apparatus, when a disc cartridge 8 in which a disc 7 is accommodated is placed on the inner tray 4, the disc 7 is clamped on a turntable 2 by a damper 9 being moved downwardly and the turntable 2 and a turntable drive motor 10 being moved upwardly. Accordingly, in the conventional apparatus, a space S1 for moving the damper 9 up and down and a space S2 for moving the turntable 2 up and down must be provided. This becomes a factor for preventing a thickness of the apparatus from being reduced.

In a portable computer such as a notebook type personal computer, there is a tendency to incorporate a disc apparatus using a CD-ROM or a disc cartridge as a recording medium as a standard option. Accordingly, it is desired to reduce a thickness of such a disc apparatus.

SUMMARY OF THE INVENTION

It is a general object of the present invention to provide an improved and useful recording-medium loading apparatus in which the above-mentioned problems are eliminated.

A more specific object of the present invention is to provide a recording-medium loading apparatus which can smoothly attach a recording medium to a tray without inconvenient operations.

Another object of the present invention is to provide a recording-medium loading apparatus having a reduced thickness.

In order to achieve the above-mentioned objects, there is provided according to the present invention a recording-medium loading apparatus for loading a recording medium to a recording and/or reproducing apparatus, comprising:

a tray movable between an exchanging position at which the recording medium is removed or inserted and a loaded position at which a recording or reproducing operation is performed on the recording medium;

a holder holding the recording medium; and a support member movably supporting the holder so that the holder is movable between an accommodating position at which the holder is accommodated in the tray and an insertion/ejection position at which the holder is separated from the tray, wherein the holder is movable to the insertion/ejection position when the tray is moved to the exchanging position, and the holder is held at the accommodating position during a process for moving the tray to the loaded position.

According to the above-mentioned invention, the holder is movable between the accommodating position at which the holder is accommodated in the tray and the insertion/ejection position at which the holder is separated from the tray, and the holder is moved to the insertion/ejection position when the tray is moved to the exchanging position. That is, the recording medium is attached on the tray after the recording medium is inserted into the holder which is separated from the tray. Thus, the recording medium can be smoothly inserted into the holder without restriction caused by a structure of the tray, which results in an easy inserting or ejecting operation of the recording medium.

In the above-mentioned invention, the tray may be positioned at one of the exchanging position and the loaded position by being moved straight; the holder may be positioned at one of the accommodating position and the insertion/ejection position by being rotated with respect to the tray; and the holder may be rotatably supported with respect to the support member.

Additionally, when a disk-like recording medium is used as the recording medium, the recording-medium loading apparatus may further comprise:

a turntable provided on the tray so as to rotate the disc-like recording medium; and a damper provided on the support member so as to attach the disc-like recording medium to the turntable when the holder is moved to the accommodating position.

According to this invention, since the disc-like recording medium is clamped on the turntable when the holder is moved to the accommodating position, a clamping operation can be performed when the tray is out of the recording and/or reproducing apparatus. Accordingly, a space required for an operation of the damper in the recording and/or reproducing apparatus can be eliminated, and, thereby, a thickness of the apparatus can be reduced. Additionally, since there is no need to provide a mechanism for moving the turntable up and down, the thickness of the apparatus can be reduced.

Additionally, when the holder is moved to the insertion/ejection position, a slanting angle of the support member with respect to the tray may be set greater than a slanting angle of the holder with respect to the tray, and the damper may be provided on an end of the support member opposite to a center of rotation of the support member so that the damper is separated from the holder. Accordingly, when the recording medium is inserted into the holder, the clamper does not block the recording medium being inserted.

Additionally, the holder may have a first end and a second end opposite to the first end, the first end having an opening through which the recording medium is inserted into the holder, the holder being slanted with respect to the tray by the second end being prevented from moving relative to the tray and the first end being moved away from the tray.

In the above-mentioned invention, the holder may be provided on the tray so that the first end and the second end are arranged along a direction of movement of the tray. Alternatively, the holder may be provided on the tray so that the first end and the second end are aligned along a direction perpendicular to a direction of movement of the tray.

Other objects, features and advantages of the present invention will become more apparent from the following detailed description when read in conjunction with the accompanying drawings.

BRIEF DESCRIPTION OF THE DRAWINGS

FIGS. 3A and 3B are cross-sectional views of the conventional apparatus for showing an interior of the apparatus when a disc is loaded;

FIG. 5 is a side view of the apparatus shown in FIG. 4 in a state in which the tray is drawn out of the disc apparatus;

FIG. 6A is a plan view of a holder; FIG. 6B is a side view of the holder; FIG. 6C is a rear view of the holder;

DETAILED DESCRIPTION OF THE PREFERRED EMBODIMENTS

A description will now be given, with reference to drawings, of a first embodiment of the present invention.

Figure 1:
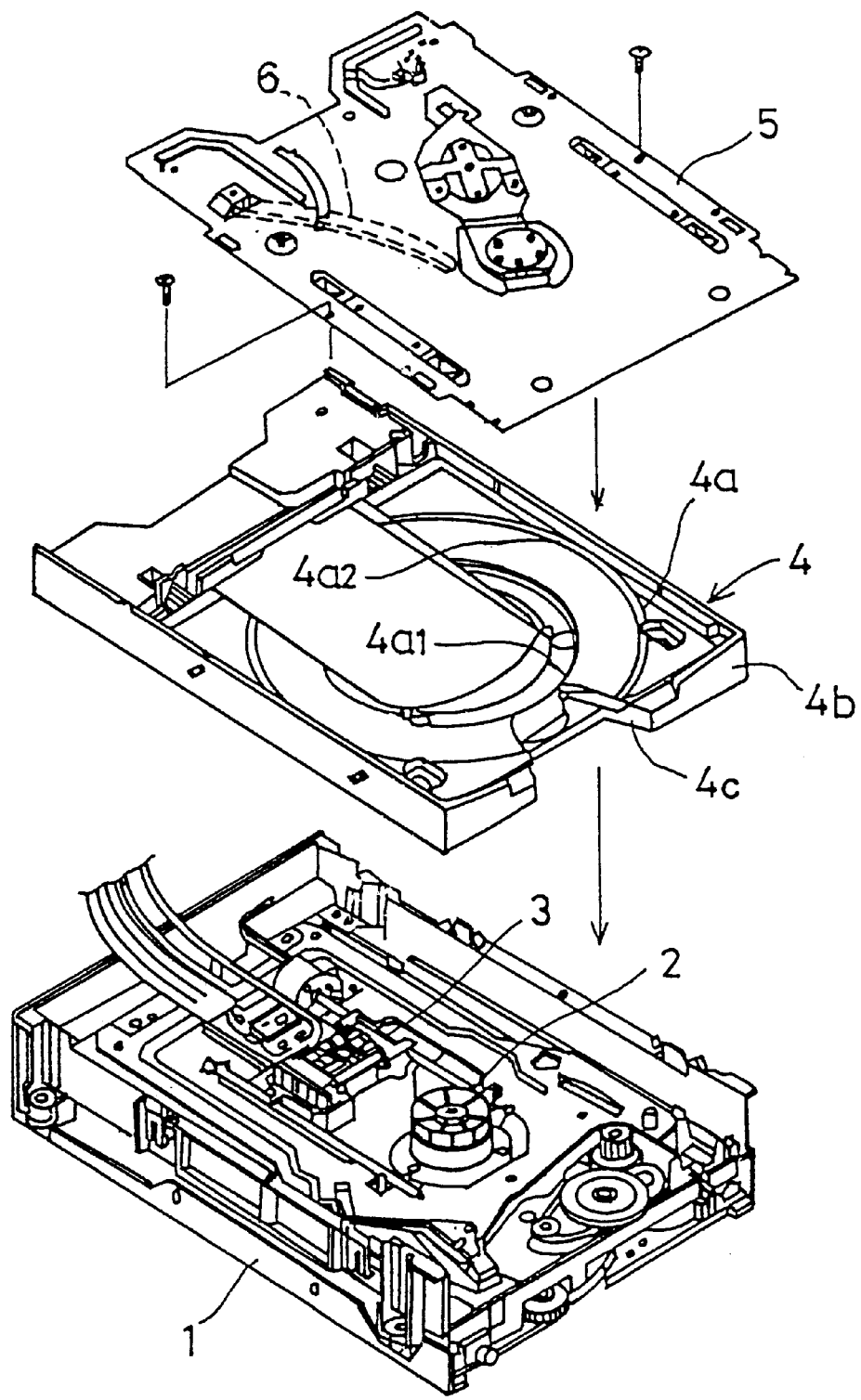
FIG. 1 is a perspective view of a conventional apparatus to which a CD-ROM or a disc cartridge can be loaded.
Figure 2A:
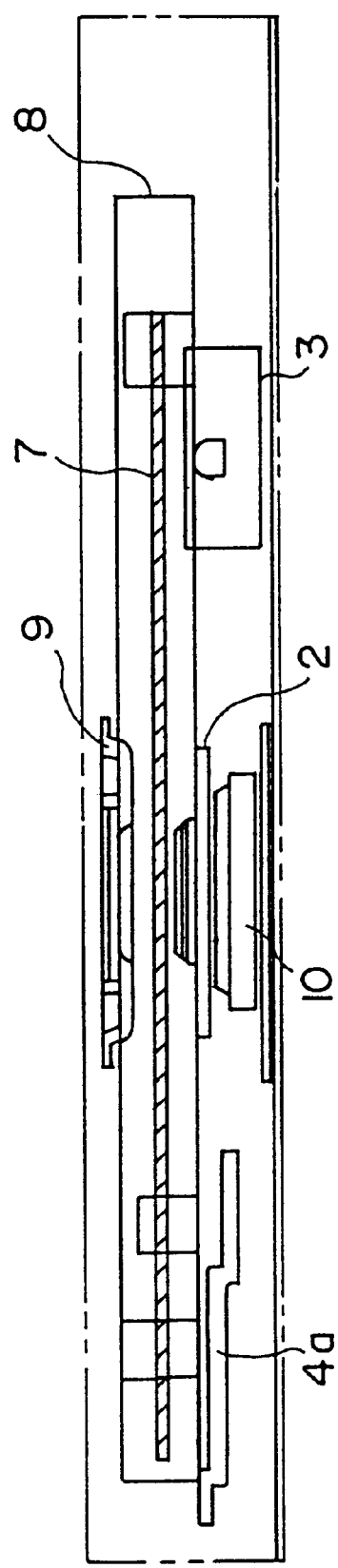
FIGS. 2A and 2B are cross-sectional views of the conventional apparatus for showing an interior of the apparatus when a disc cartridge is loaded.
Figure 2B:
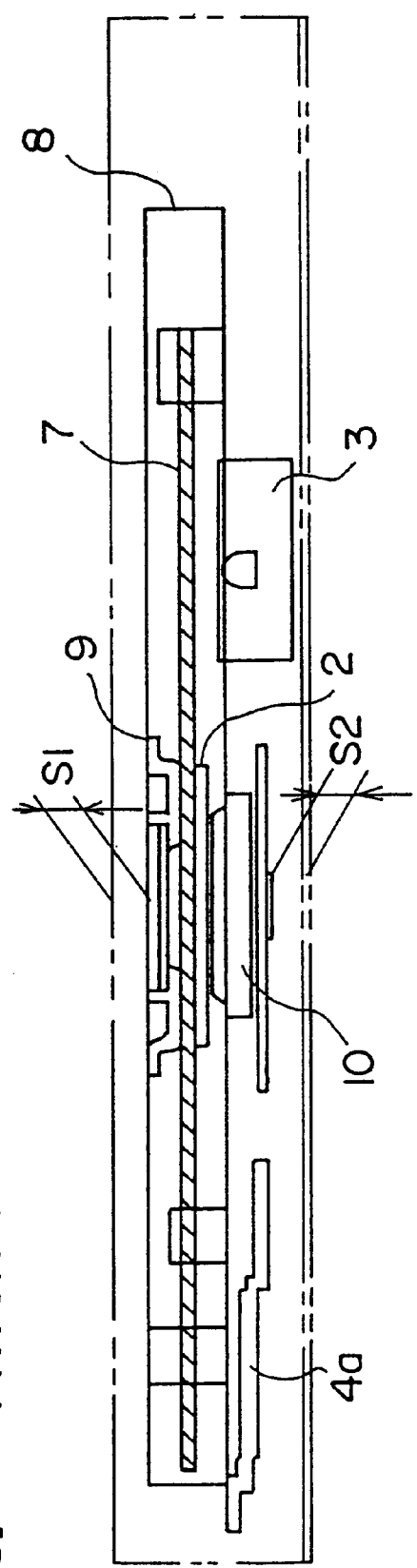
Figure 4:
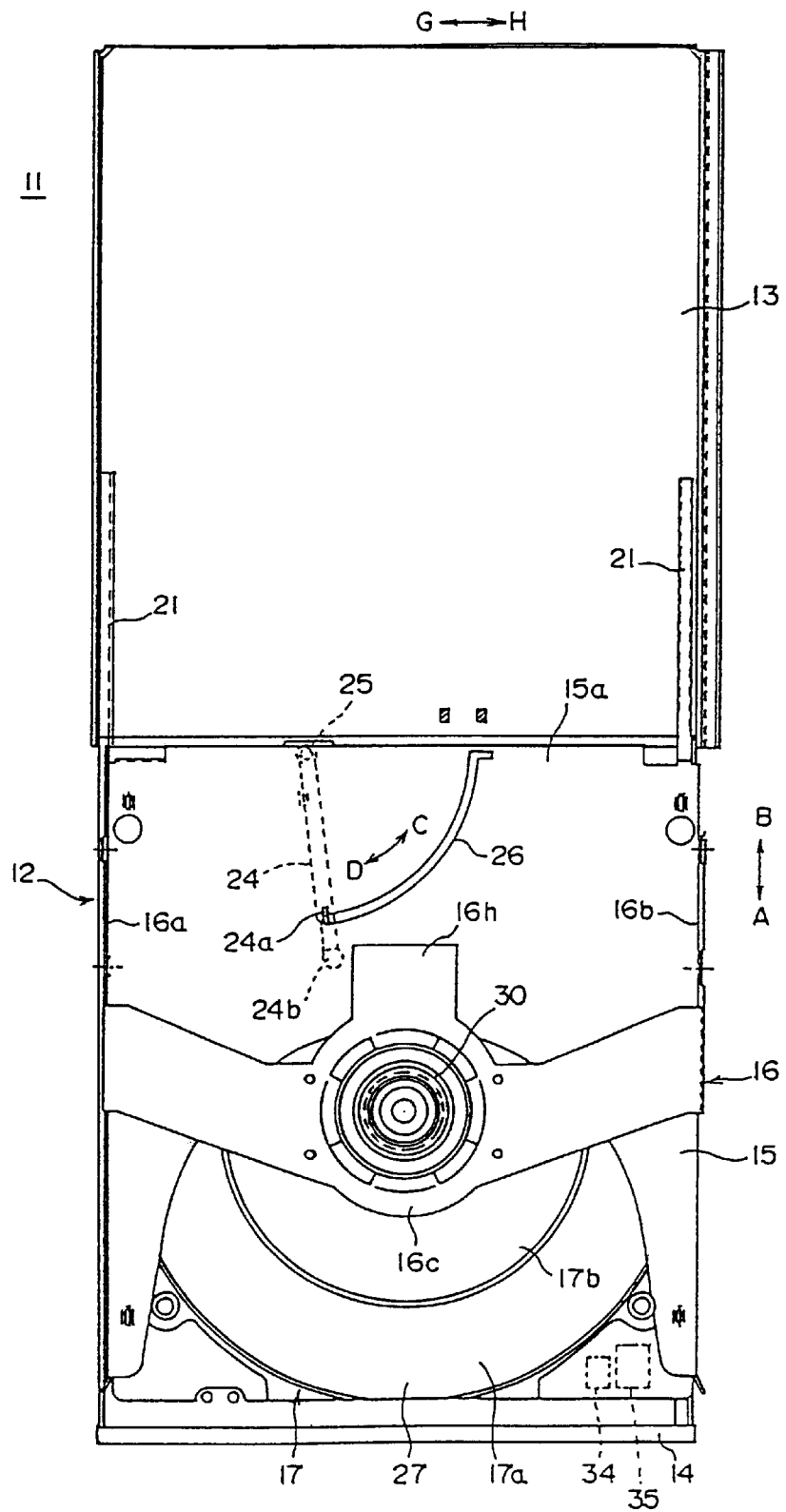
FIG. 4 is a plane view of a disc apparatus to which a recording-medium loading apparatus according to the first embodiment of the present invention is applied in a state in which a tray is drawn out of the disc apparatus.

FIG. 4 is a plane view of a disc apparatus to which a recording-medium loading apparatus according to the first embodiment of the present invention is applied in a state in which a tray is drawn out of the disc apparatus. FIG. 5 is a side view of the apparatus shown in FIG. 4 in a state in which the tray is drawn out of the disc apparatus.

The disc apparatus 11 shown in FIGS. 4 and 5 is used as an external storage apparatus of, for example, a personal computer (not shown in the figure). The disc apparatus 11 has a loading apparatus 12 to which a disk-like recording medium (for example, a CD-ROM, a PD disc cartridge or a DVD disc cartridge) is attached as described later.

The loading apparatus 12 comprises a tray 14, a holder 15 and a clamper arm 16. The tray 14 is drawn out of a housing 13 of the disc apparatus 11 for insertion or removal of a disc. The disc is inserted into the holder 15. The clamper arm 16 movably supports the holder 15 between an accommodating position at which the holder is accommodated in the tray 14 and a recording medium insertion/ejection position at which the holder protrudes from the tray 14 upwardly.

The tray 14 is movably mounted in directions indicated by arrows A and B with respect to the housing 13. The tray 14 is movable to an exchanging position at which the recording medium is exchanged by being drawn in the direction A, or to a loaded position at which a recording or reproducing operation can be performed by being accommodated within the housing 13. The holder 15 moves to the recording-medium insertion/ejection position above the tray 14 when the tray 14 is moved to the exchanging position, and moves to the accommodating position inside the housing when the tray 14 moves to the loaded position. A disc-placing member 17 on which a disc having a diameter of 8 cm or 12 cm is placed is mounted to the holder 15.

A turntable 18 on which the disc is to be attached, a disc motor 19 which rotates the turntable 18 and a pickup 20 which reads information recorded on the disc are provided on a top surface of the tray 14. Additionally, a guide groove 22 extending in the directions A and B is formed on each side of the tray 14 so that a guide rail 21 is slidably fit in the guide groove 22. The guide rail 21 supports each side of the tray 14 while sliding in the direction A or B by linking with a movement of the tray 14 in the direction A or B.

FIG. 6A is a plan view of the holder 15; FIG. 6B is a side view of the holder 15; and FIG. 6C is a rear view of the holder 15.

As shown in FIGS. 6A to 6C, the holder 15 comprises a top plate 15, side plates 15b and 15c bent from opposite sides of the top plate 15 in a downward direction, bottom plates 15d and 15e bent in a horizontal direction from the respective side plates 15b and 15c and a back plate 15f bent from a rear side of the top plate 15a in a downward direction.

A recessed portion 15g having a semi-circular shape is formed on the top plate 15a of the holder 15 so that a disc such as a CD-ROM can be attached. Additionally, semi-circular recessed portions 15h and 15i which correspond to an outer diameter of the disc placing member 17 are formed on the bottom plates 15d and 15e, respectively.

The disc placing member 17 has a first disc placing portion 17a for a CD-ROM having a diameter of 12 cm, a second disc placing portion 17b for a CD-ROM having a diameter of 8 cm and an opening 17c which is opposite to the turntable 18 and the pickup 20. The disc-placing member 17 is fixed to the bottom plates 15d and 15e of the holder 15.

A space surrounded by the top plate 15a, the side plates 15b and 15c and the bottom plates 15d and 15e in the holder 15 serves as a cartridge inserting portion 23. An insertion opening 27 is formed in the direction A of the cartridge-inserting portion 23. A PD disc cartridge or a DVD disc cartridge is inserted into the cartridge inserting portion 23 via the insertion opening 27 as described later.

A shaft 25 is uprightly provided on a rear portion of the top plate 15a of the holder 15. The shaft 25 rotatably supports a shutter opening lever 24 which opens a shutter of the PD disc cartridge or the DVD disc cartridge. An engaging portion 24a of the shutter-opening lever 24 engages an arc-like guide groove 26 provided on the top plate 15a. An end of the shutter-opening lever is provided with a cylindrical contact portion 24b which contacts a side of the shutter of the disc cartridge. The shutter-opening lever 24 rotates in a direction indicated by an arrow C by linking with the cartridge being inserted into the holder 15 via the insertion opening 27 so as to open the shutter of the cartridge. Additionally, the shutter-opening lever 24 rotates in a direction indicated by an arrow D by linking with an ejecting operation of the cartridge so as to close the shutter.

An opening 28 to which a support arm 16 is connected is provided on each of the side plates 15b and 15c of the holder 15. The holder 15 can rotate in an upward or downward direction by being supported by a shaft 29 inserted into the opening 28.

Figure 7A:
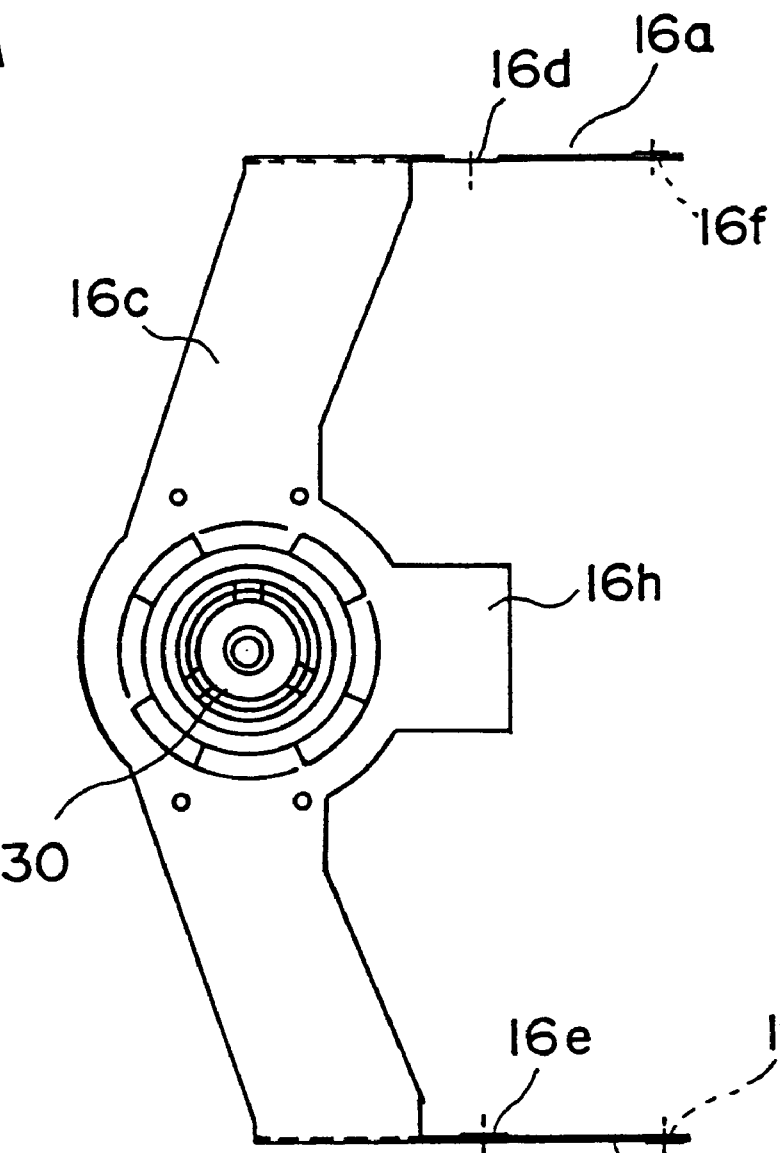
FIG. 7A is a plan view of a clamper arm.
Figure 7B:
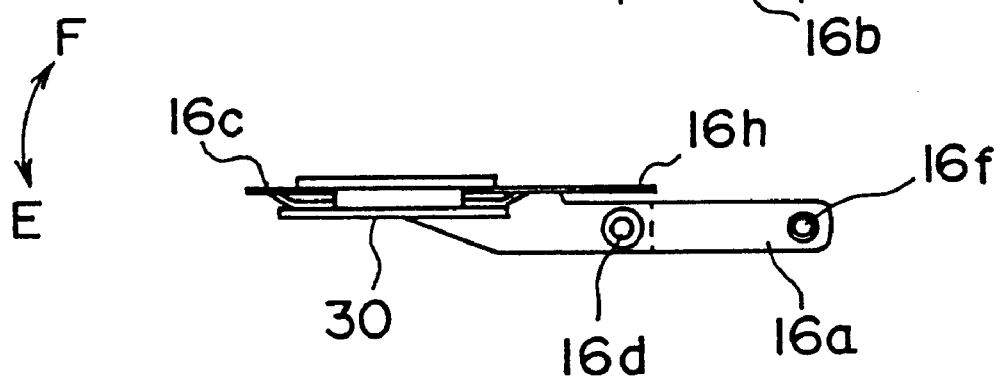
FIG. 7B is a side view of the clamper arm.

FIG. 7A is a plan view of the clamper arm 16; FIG. 7B is a side view of the clamper arm 16.

As shown in FIGS. 7A and 7B, the clamper arm 16 comprises arm portions 16a and 16b extending along the respective side plates 15b and 15c of the holder 15, a beam 16c bridging between ends of the arm portions 16a and 16b and a damper 30 swingably supported on the beam 16c at the center thereof. The arm portions 16a and 16b of the clamper arm 16 have openings 16d and 16e, respectively, into which the shafts 29 of the holder 15 are inserted. Additionally, the arm portions 16a and 16b of the clamper arm 16 have openings 16f and 16g, respectively, into which the shafts 32 of a bracket 31 which uprightly protrudes from each of the opposite sides of the tray 14 are inserted. Accordingly, the clamper arm 16 is rotatably supported by the shafts 32 in directions indicated by arrows E and F. Additionally, when the clamper arm 16 rotates in the direction E, the holder 15 is moved downwardly into the tray 14 and the damper 30 is also moved downwardly so that the disc in the cartridge is clamped.

The clamper arm 16 is urged by a spring force of a torsion spring 33 (indicated by dotted lines in FIG. 5) in an upward direction (the direction F). The damper arm 16 is provided with a stopper portion 16h which rearwardly extends from the beam 16c. The stopper portion 16h contacts the top plate 15a of the holder 15 when the damper arm 16 is rotated upwardly (in the direction F) by a predetermined angle by a spring force of the torsion spring 33. Thus, a further rotation of the damper arm 16 in the direction F is prevented. Accordingly, rotation of the clamper 30 supported by the damper arm 16 is stopped at a position at which the damper arm 16 forms a predetermined angle with respect to the top plate 15a of the holder 15, and, thereby, the clamper 30 is moved to a position at which the damper 30 does not block the disc 37 or the disc cartridge 36 being inserted into the holder 15. The angle of the clamper 30 with respect to the holder 15, when the holder 15 is moved to the recording medium insertion/ejection position, can be arbitrarily set by changing a length of the stopper portion 16h.

Additionally, a magnet 34 which attracts the holder 15 so as to hold the holder 15 at a position accommodated in the tray 14 and an electromagnet 35 which cancels the holding of the holder 15 are provided on a front part of the tray 14. The electromagnet 35 is activated when the tray 14 reaches the recording-medium exchanging position so as to generate a magnetic field which cancels a magnetic field of the magnet 34. Accordingly, the holder 15 attracted into the tray 14 by the magnet 34 is unlocked by the electromagnet 35, and the holder 15 rotates in an upward direction (the direction F) by a spring force of the torsion spring 33. Thereby, the holder 15 is set in a state in which the holder 15 is slanted with the insertion opening 27 facing in an upward direction. Thus, an inserting/ejecting operation of the disc or the disc cartridge can be easily performed. A smooth exchanging operation of the disc or the disc cartridge can be achieved.

It should be noted that, when the holder 15 is rotated in the direction F and set in a slanting state, the rear portion of the top plate 15a of the holder 15 contacts the front end of the housing 13, which results in a limitation of the rotation of the holder in the direction F. This position defines the recording medium insertion/ejection position.

Figure 8:
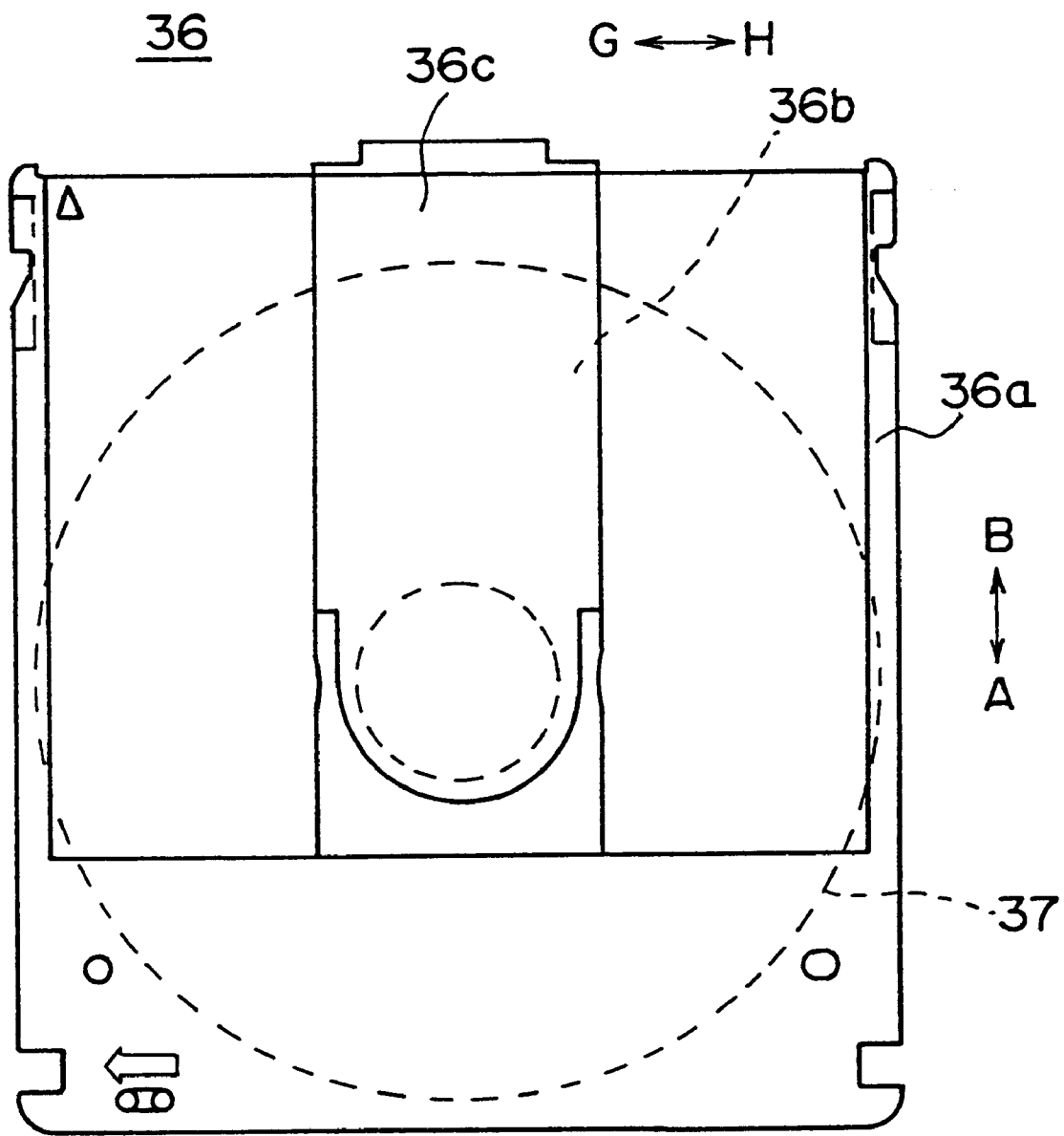
FIG. 8 is a plan view of an example of a disc cartridge.

FIG. 8 is a plan view of an example of the disc cartridge. As shown in FIG. 8, the disc cartridge 36 has a case 36a which is formed in a box-like shape, in which case 26 the disc 37 (indicated by a dotted line in FIG. 8) is accommodated. A rectangular opening 36b is formed on top and bottom surfaces of the case 36a so as to expose the disc 37 to enable a recording or reproducing operation of the optical pickup 20, the opening 36b extending in a radial direction of the disc 37. Additionally, a shutter 36c which closes the opening 36b is movably provided in directions indicated by arrows G and H on the top and bottom surfaces of the case 36a. The shutter 36c is urged toward a position to close the opening 36b by a spring member (not shown in the figure). The shutter 36c is moved in the direction H by the shutter opening lever 24 in a process of the holder 15 being accommodated in the tray 14, and, thereby, the opening 36b is opened.

Figure 9:
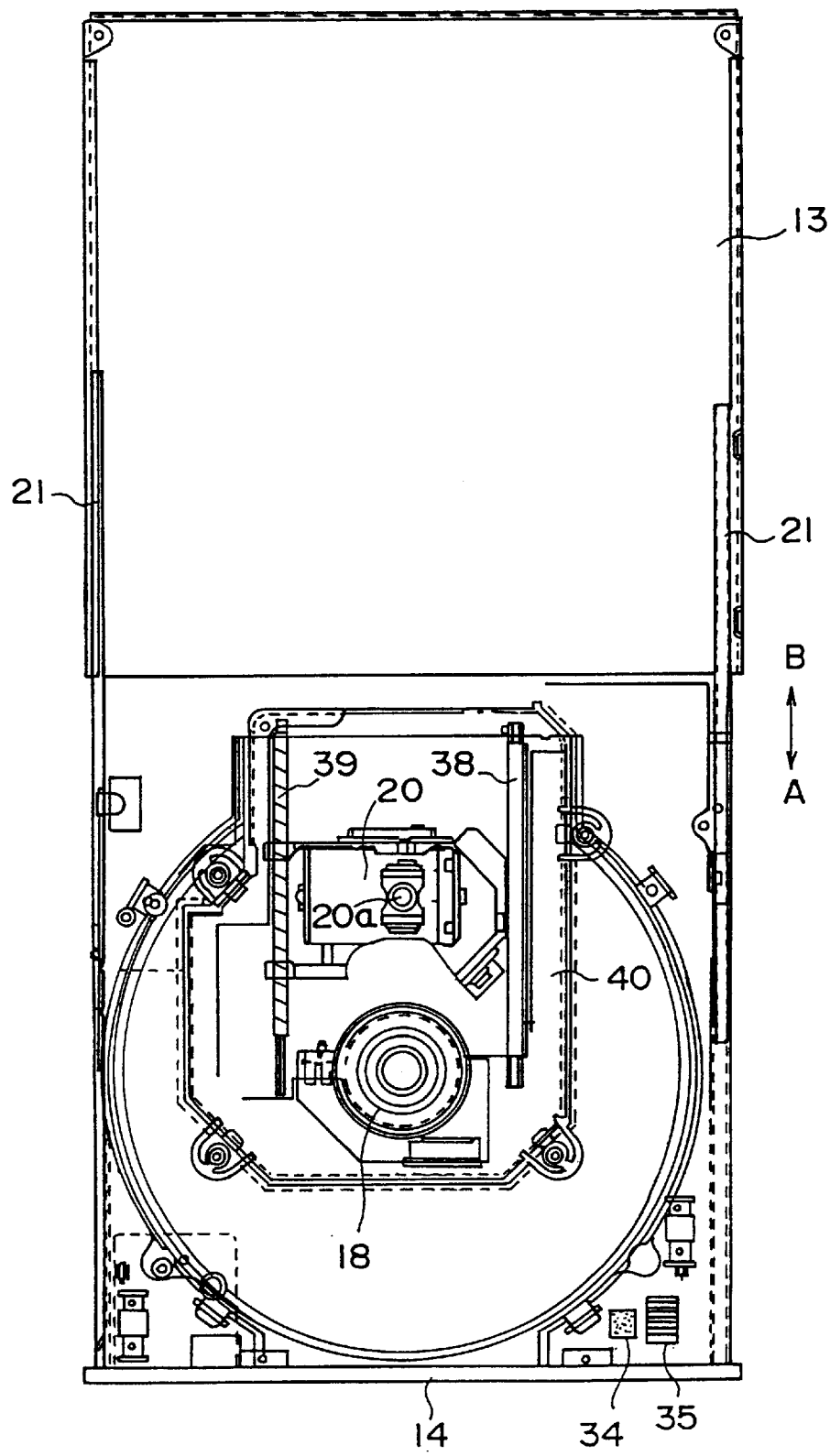
FIG. 9 is a plan view of a top surface of a tray.

FIG. 9 is a plan view showing a top surface of the tray 14. It should be noted that FIG. 9 shows a state in which the tray 14 and the holder 15 are removed.

As shown in FIG. 9, a sub-chassis 40 is mounted on the top surface of the tray 14. The turntable 18, the disc motor 19 and the pickup 20 are mounted on the sub-chassis 40. The pickup 20 is moved in a tracking direction (a radial direction of the disc) by being guided by a guide shaft 38 and a lead screw 39, the guide shaft 38 being formed to extend in the directions A and B. The lead screw 39 is rotated by a pickup drive motor (not shown in the figure). Accordingly, an objective lens 20a of the pickup 20 moves a distance corresponding to an amount of rotation of the lead screw 39.

In the present embodiment, since the turntable 18 and the disc motor 19 are provided on the tray 14, there is no need to provide a mechanism to move the turntable 18 and the disc motor up and down. Accordingly, a structure of the apparatus can be simplified and a thickness of the apparatus can be reduced.

A description will now be given of an operation of the loading apparatus 12.

Figure 10:
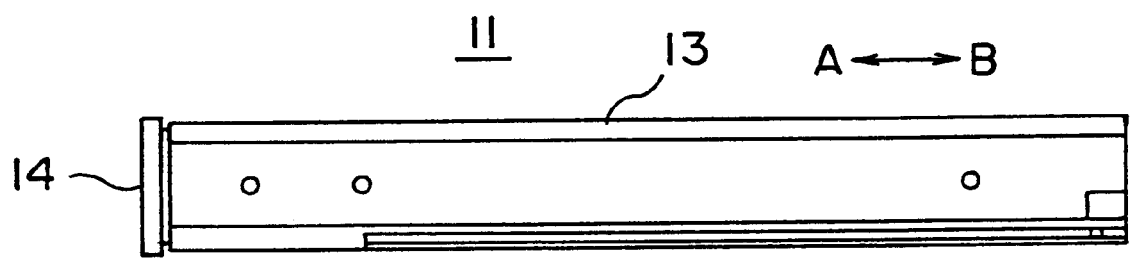
FIG. 10 is a side view of the loading apparatus in a state in which the tray is accommodated in a housing.
Figure 11:
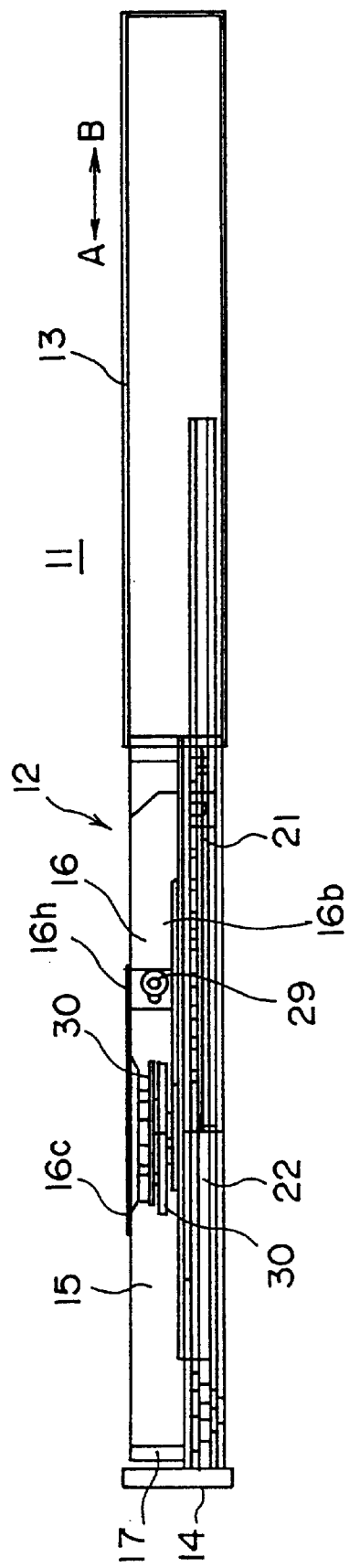
FIG. 11 is a side view of the loading apparatus in a state in which the tray is drawn out of the housing.
Figure 12:
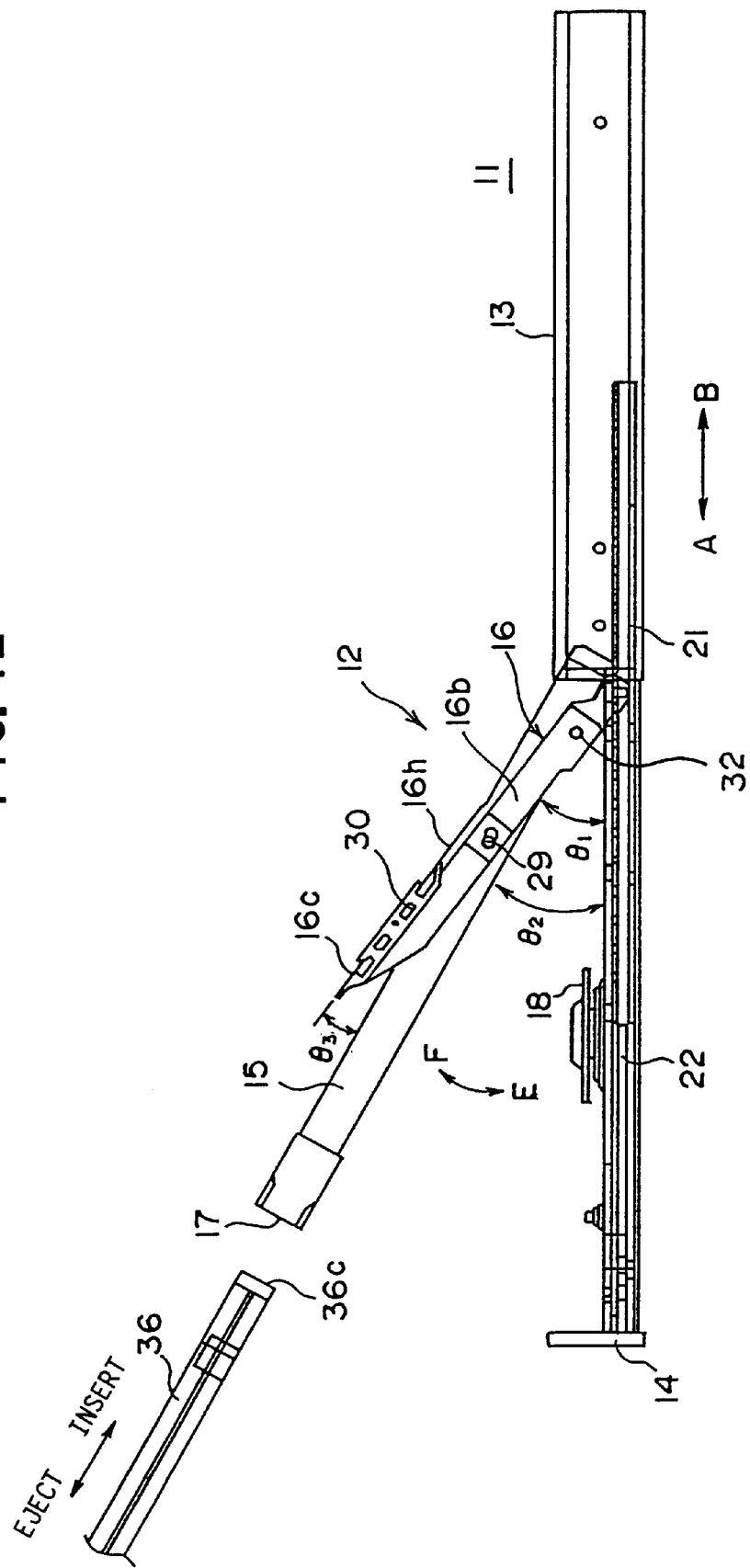
FIG. 12 is a side view of the loading apparatus in a state in which the holder protrudes upwardly from the tray.

FIG. 10 is a side view of the loading apparatus 12 in a state in which the tray 14 is accommodated in the housing. FIG. 11 is a side view of the loading apparatus in a state in which the tray 14 is drawn out of the housing. FIG. 12 is a side view of the loading apparatus in a state in which the holder 15 protrudes upwardly from the tray 14.

When loading the disc 37 or the above-mentioned disc cartridge 36, the tray 14 accommodated in the housing 13 as shown in FIG. 10 is drawn in the direction A. When the tray 14 is moved toward the recording-medium exchanging position, the holder 15 and the damper arm 16 are out of the housing 13. In this state, the holder 15 is attracted toward the tray 14 by a magnetic force of the magnet 34.

When the tray 14 reaches the recording-medium exchanging position, the electromagnet 35 is activated so as to cancel the attracting force of the holder 15. Thereby, the holder 15 is rotated together with the damper arm 16 in the direction F due to the spring force of the torsion spring 33.

As shown in FIG. 12, the damper arm 16 rotates about the shaft 32 of the bracket 31 (not shown in FIG. 12). Additionally, the holder 15 rotates about the shafts 29 provided at the middle portion of each of the arm portions 16a and 16b of the clamper arm 16. Accordingly, the rotational angle θ1 of the damper arm 16 is greater than the rotational angle θ2 of the holder 15 (θ1>θ2).

After the damper arm 16 starts to rotate in the direction F, a rear portion of the top plate 15a of the holder 15 contacts the front end of the housing 13, and, thereby, an upward movement of the top plate 15a is limited. Thus, the holder 15 starts to rotate about the shafts 29. When the damper arm 16 rotates in the direction F, the holder 15 rotates with a slight delay from the rotation of the damper arm 16.

Accordingly, when the damper arm 16 rotates the predetermined angle θ1 in the direction F, the holder 15 reaches the recording medium insertion/ejection position in a state in which the holder 15 is slanted the predetermined angle θ2 so that the insertion opening 27 faces upward. At this time, the damper 30 supported on the damper arm 16 rotates a predetermined angle θ3 from the holder 15 in the direction F and is located at a position separate from the holder 15. Thus, the damper 30 is moved to the position away from the top plate 15a of the holder 15 in the F direction. Accordingly, the damper 30 is located at a position at which the clamper 30 does not block the inserting or ejecting operation of the disc 37 or the disc cartridge 36.

Accordingly, the inserting or ejecting operation of the disc 37 or the disc cartridge 36 with respect to the holder 15 which is slanted a predetermined angle can be easily performed, and, thereby, a smooth exchanging operation of the disc 37 or the disc cartridge 36 can be achieved. The disc cartridge 36 is positioned with a side to which the shutter 36c is provided is ahead and is inserted into the holder 15 via the insertion opening 27 in a direction (the direction B) perpendicular to the opening and closing directions of the shutter 36, that is, an extending direction of the shutter 36c. Additionally, during a process in which the cartridge 36 is inserted into the holder 15, the shutter 36c of the disc cartridge 36 moves in a direction (the direction B) to open the opening 36b by the shutter opening lever 24.

After the disc cartridge 36 is inserted into the cartridge insertion portion 23 in the holder 15 via the insertion opening 27 or the disc 37 is placed on the disc placing member 17 in the holder 15, the holder 15 is pushed downwardly. Thereby, the holder 15 rotates about the shafts 29 of the clamper arm 16 in the direction E, and also the damper arm 16 rotates about the shafts 32 in the direction E. Then, the holder 15 moves down on the tray 14 and is attracted by the magnet 34, and the damper 30 supported on the damper arm 16 presses the disc 37 against the turntable 18 so as to clamp the disc 37. Thereafter, the tray 14 is pressed in the direction B and is accommodated in the housing 13.

As mentioned above, since the damper 30 is supported by the clamper arm 16 which rotatably supports the holder 15, the disc 37 is clamped between the damper 30 and the turntable 18 during the process to accommodate the holder 15 in the tray 14. Accordingly, when the tray 14 reaches the loaded position at which a recording or reproducing operation can be performed, the disc 37 has already been clamped. That is, since the damper 30 is moved upwardly in a state in which the tray 14 is drawn to the exchanging position, there is no need to provide a space for moving the damper 30 up and down in the housing 13. Thus, a thickness of the apparatus can be reduced.

A description will now be given of a second embodiment of the present invention.

Figure 13:
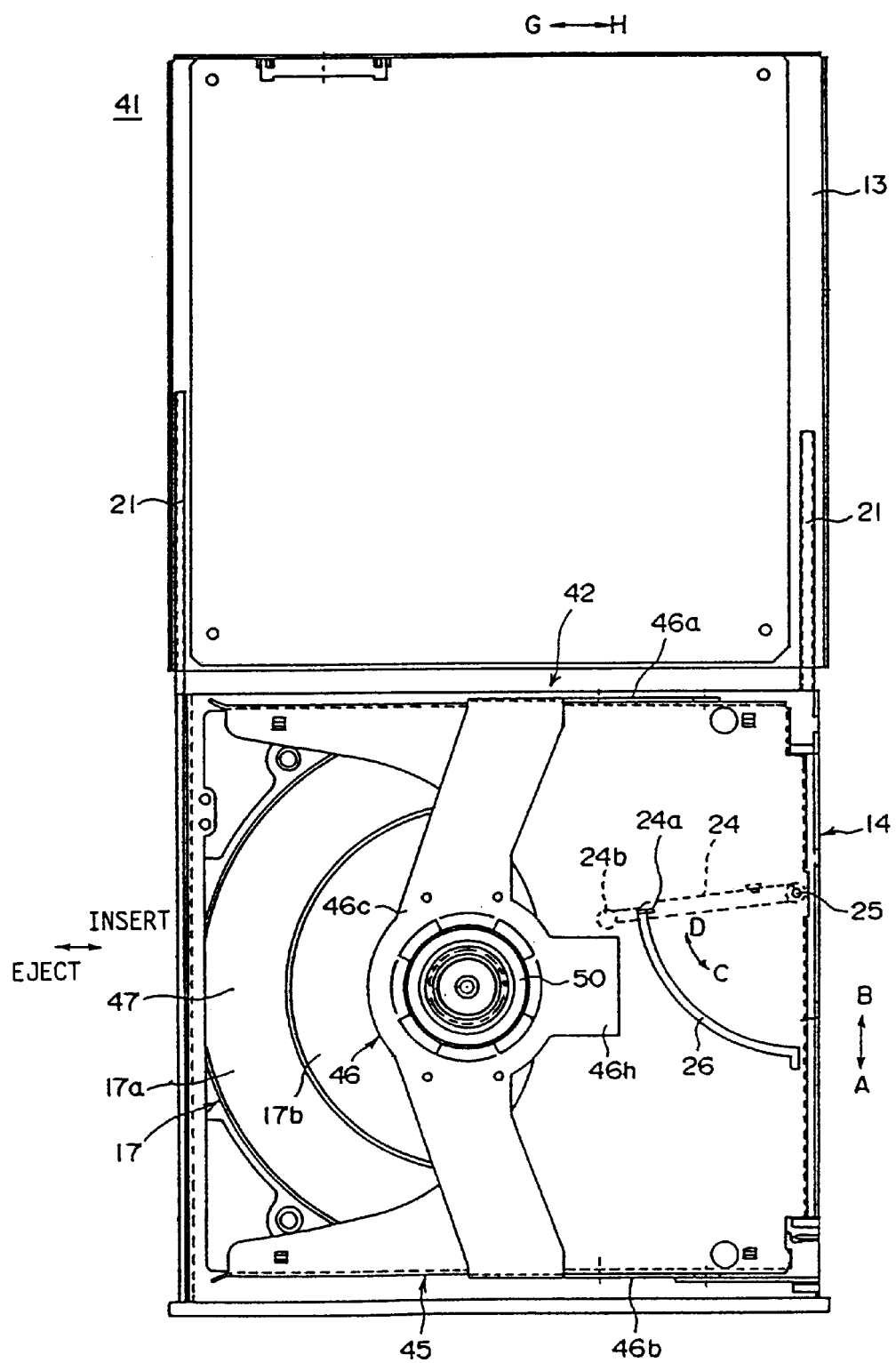
FIG. 13 is a plan view of a loading apparatus according to a second embodiment of the present invention in a state in which a tray is drawn out.
Figure 14:
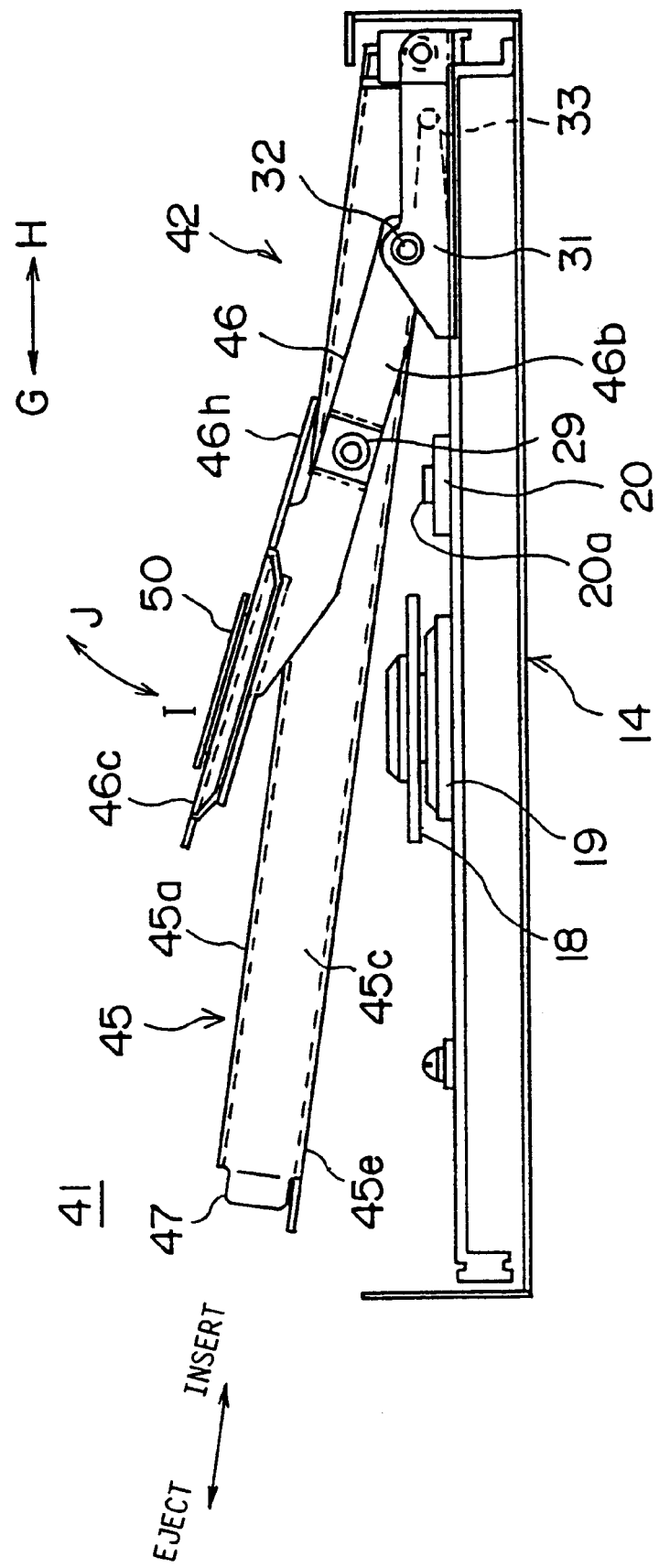
FIG. 14 is a side view of the loading apparatus shown in FIG. 13 in a state in which a holder and a damper arm are rotated to a recording medium insertion/ejection position.

FIG. 13 is a plan view of a loading apparatus 42 according to the second embodiment of the present invention in a state in which a tray is drawn out. FIG. 14 is a side view of the loading apparatus 42 in a state in which a holder 45 and a damper arm 46 are rotated to a recording medium inserting/ejecting position. In FIGS. 13 and 14, parts that are the same as the parts of the above-mentioned first embodiment are given the same reference numerals, and descriptions thereof will be omitted.

As shown in FIGS. 13 and 14, in the loading apparatus 42 provided in the disc apparatus 41, the holder 45 and the clamper arm 46 are extended in the directions G and H which are perpendicular to the direction (directions A and B) of movement of the tray 14. Accordingly, an insertion opening 47 of the holder 45 faces leftward direction of the tray 14. Thus, the disc cartridge 36 is loaded to the disc apparatus 41 by being inserted into the insertion opening 47 on the left side of the holder 45 which direction is perpendicular to the direction of insertion in the loading apparatus according to the above-mentioned first embodiment.

That is, the loading apparatus 42 is mounted in a state in which the loading apparatus 42 is rotated 90 degrees in a clockwise direction with respect to the loading apparatus 12 according to the above-mentioned first embodiment. The holder 45 and the damper arm 46 are rotatably provided in directions indicated by arrows I and J which are perpendicular to the direction (directions A and B) of movement of the tray 14. It should be noted that beam 46c and stopper portion 46h perform the same function in this embodiment as respective elements 16c and 16h of the first embodiment illustrated FIGS. 7A and 7B. Also, the bottom plate 45e is the equivalent of bottom plate 15e illustrated in FIGS. 6A–6C.

Figure 15:
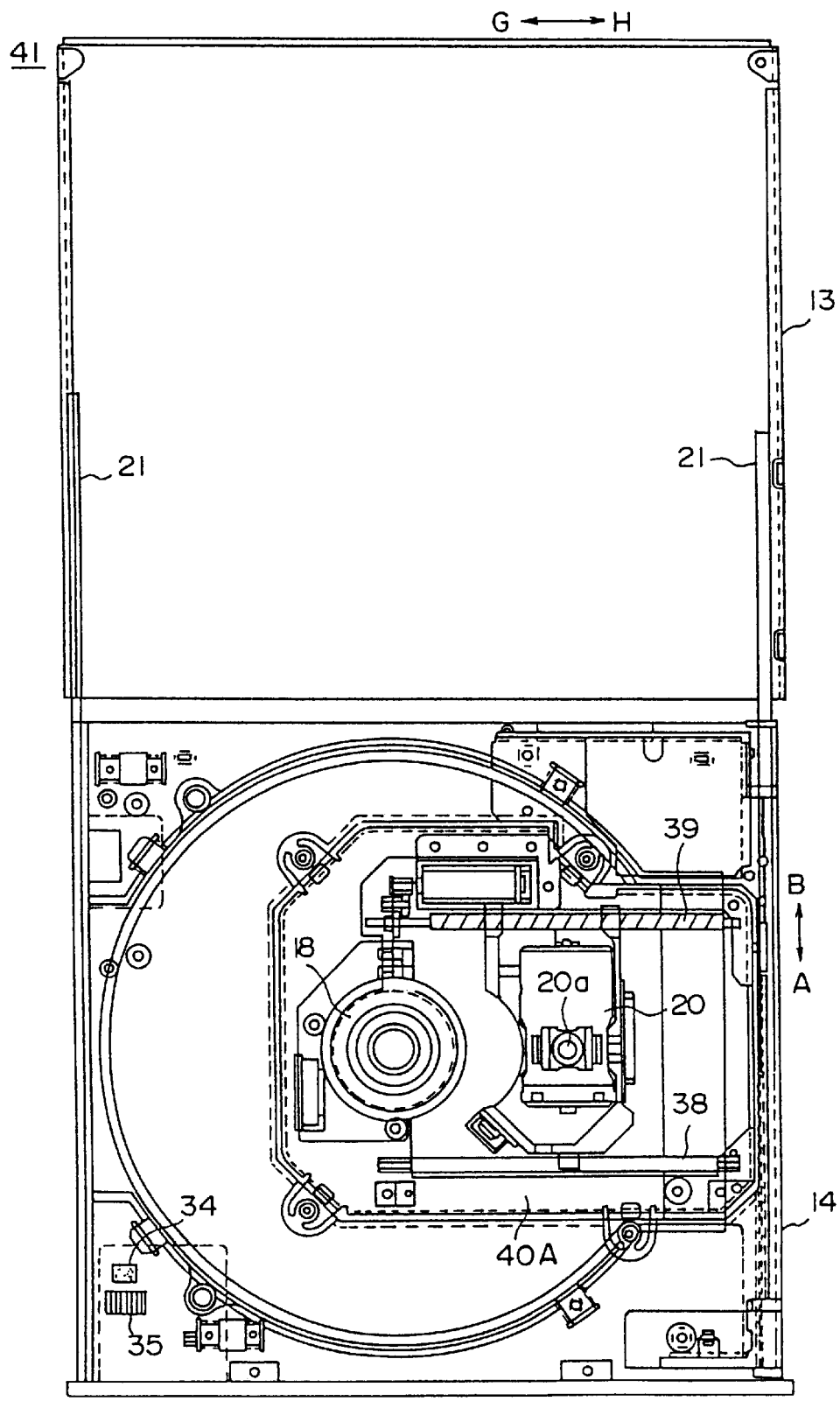
FIG. 15 is a plan view of the tray in a state in which the holder and the damper arm are removed.

FIG. 15 is a plan view of the tray 14 in a state in which the holder 45 and the damper arm 46 are removed. As shown in FIG. 15, a sub-chassis 40A is mounted on the top surface of the tray 14. The turntable 18, the disc motor 19 and the pickup 20 are mounted on the sub-chassis 40A. The sub-chassis 40A extends in the directions G and H which are perpendicular to the direction (directions A and B) of movement of the tray 14 in response to a direction of mounting of the holder 15 and the clamper arm 16.

Accordingly, the pickup 20 is moved in a tracking direction (directions G or H) by being guided by a guide shaft 38 and a lead screw 39, the guide shaft 38 being formed to extend in the directions G and H. Accordingly, the objective lens 20a of the pickup 20 moves a distance corresponding to an amount of rotation of the lead screw 39 being rotated by a pickup drive motor (not shown in the figure).

A description will now be given of an operation of the loading apparatus 42.

Figure 16:
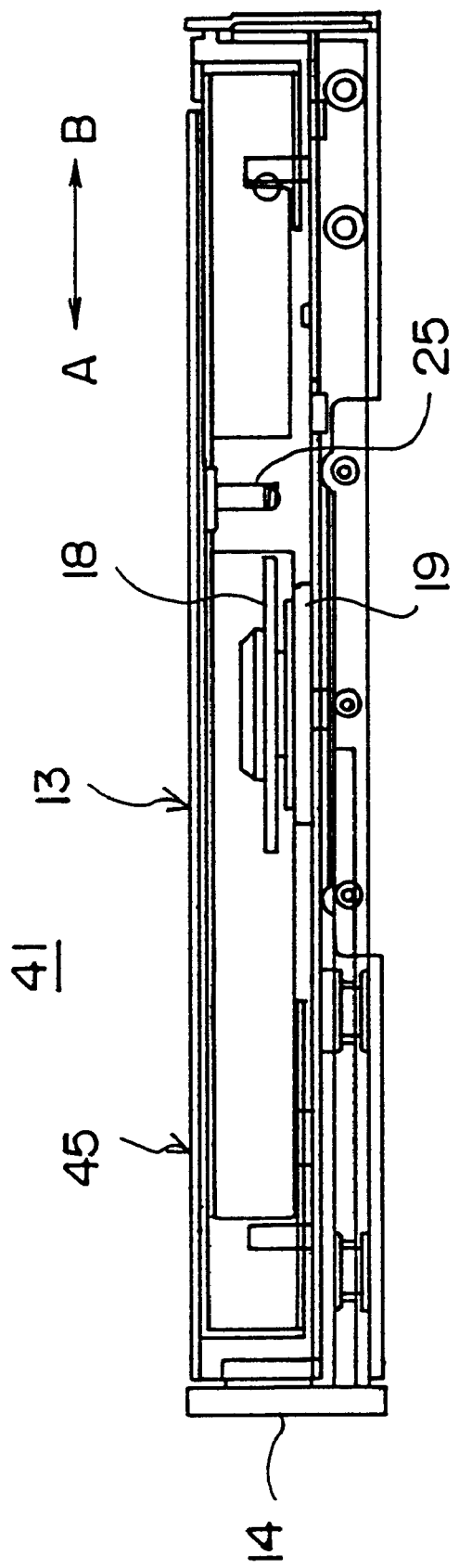
FIG. 16 is a cross-sectional view of the loading apparatus according to the second embodiment in a state in which the tray is accommodated in the housing, viewed in a side direction.
Figure 17:
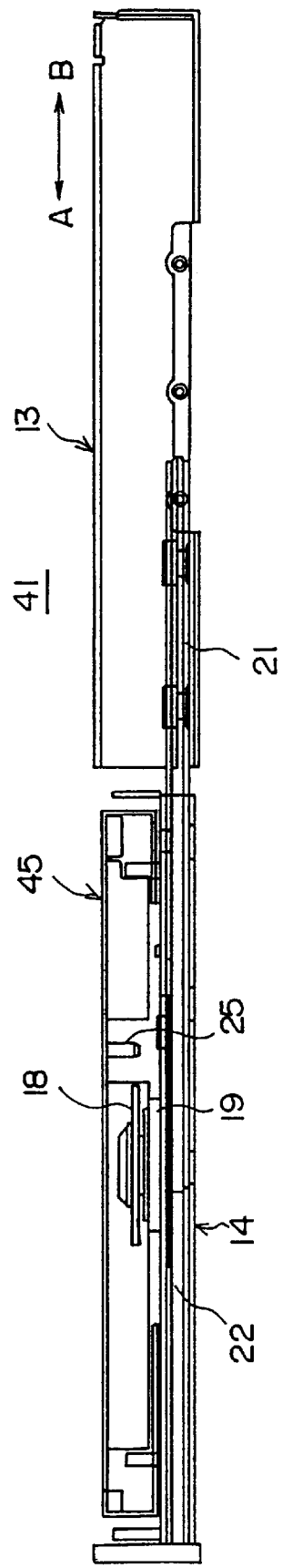
FIG. 17 is a cross-sectional view of the loading apparatus according to the second embodiment in a state in which the tray is drawn out of the housing, viewed in a side direction.
Figure 18:
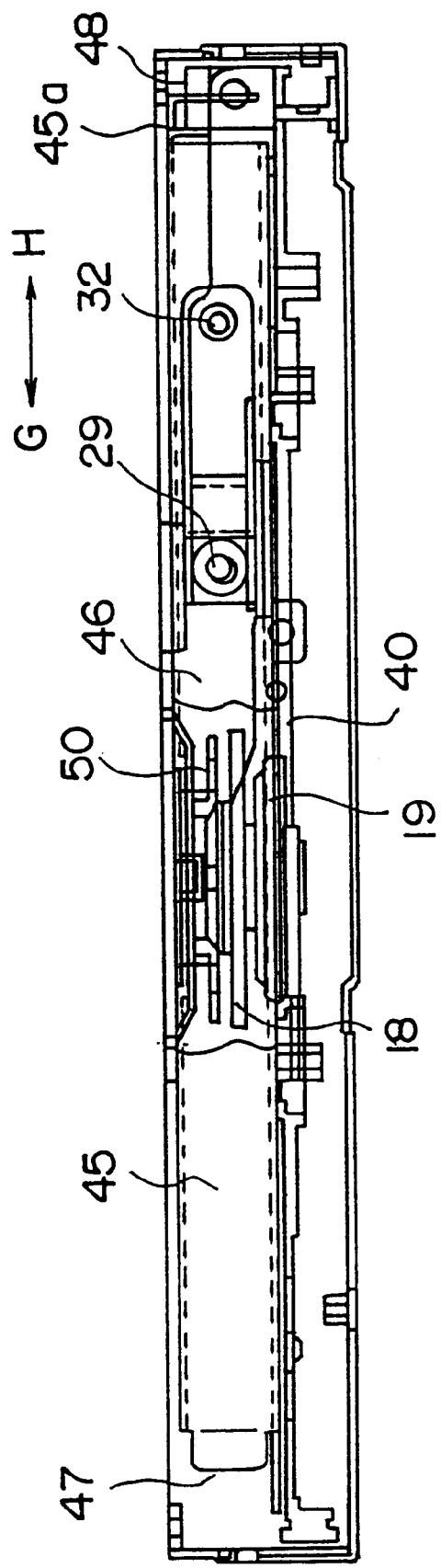
FIG. 18 is a cross-sectional view of the loading apparatus according to the second embodiment in a state in which the tray is drawn out of the housing, viewed in a front direction.
Figure 19:
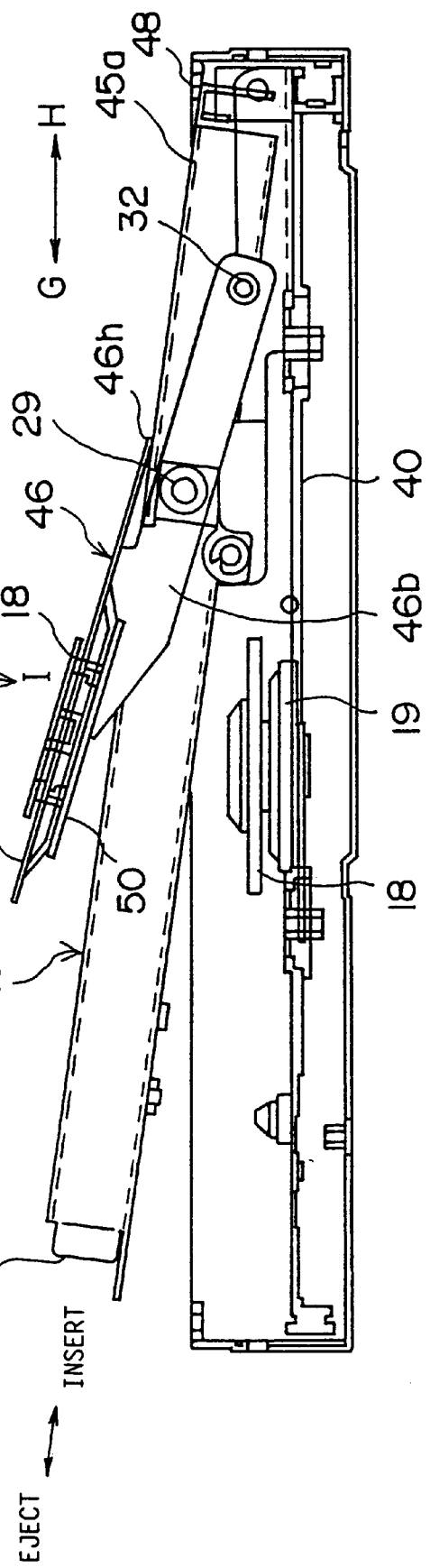
FIG. 19 is a cross-sectional view of the loading apparatus according to the second embodiment in a state in which the holder is upwardly rotated from the tray.

FIG. 16 is a cross-sectional view of the loading apparatus according to the second embodiment in a state in which the tray 14 is accommodated in the housing, viewed in a side direction. FIG. 17 is a cross-sectional view of the loading apparatus according to the second embodiment in a state in which the tray 14 is drawn out of the housing, viewed in a side direction. FIG. 18 is a cross-sectional view of the loading apparatus according to the second embodiment in a state in which the tray 14 is drawn out of the housing, viewed in a front direction. FIG. 19 is a cross-sectional view of the loading apparatus according to the second embodiment in a state in which the holder 15 is upwardly rotated from the tray 14.

When loading the disc 37 or the above-mentioned disc cartridge 36, the tray 14 accommodated in the housing 13 as shown in FIG. 16 is drawn in the direction A. When the tray 14 is moved toward the recording-medium exchanging position, the holder 45 and the damper arm 46 are out of the housing 13. In this state, the holder 45 is attracted toward the tray 14 by a magnetic force of the magnet 34. When the tray 14 reaches the recording-medium exchanging position, the electromagnet 35 is activated so as to cancel the attracting force of the holder 45. Thereby, the holder 15 is rotated together with the clamper arm 46 in the direction J due to the spring force of the torsion spring 53.

As shown in FIG. 19, the damper arm 16 rotates about a shaft 62. Additionally, the holder 45 rotates about the shafts 59 provided at the middle portion of each of arm portions 46a and 46b of the damper arm 46. Accordingly, the rotational angle θ1 of the damper arm 46 is greater than the rotational angle θ2 of the holder 45 (θ1>θ2).

After the damper arm 46 starts to rotate in the direction J, a right-end portion of a top plate 45a of the holder 45 contacts an engaging portion 48 which is uprightly protruding from the right side surface of the tray 14. Thereby, an upward movement of the rear-end portion of the top plate 45a is limited. Thus, the holder 45 starts to rotate about the shafts 59. When the damper arm 46 rotates in the direction J, the holder 45 rotates with a slight delay from the rotation of the clamper arm 46.

Figure 20:
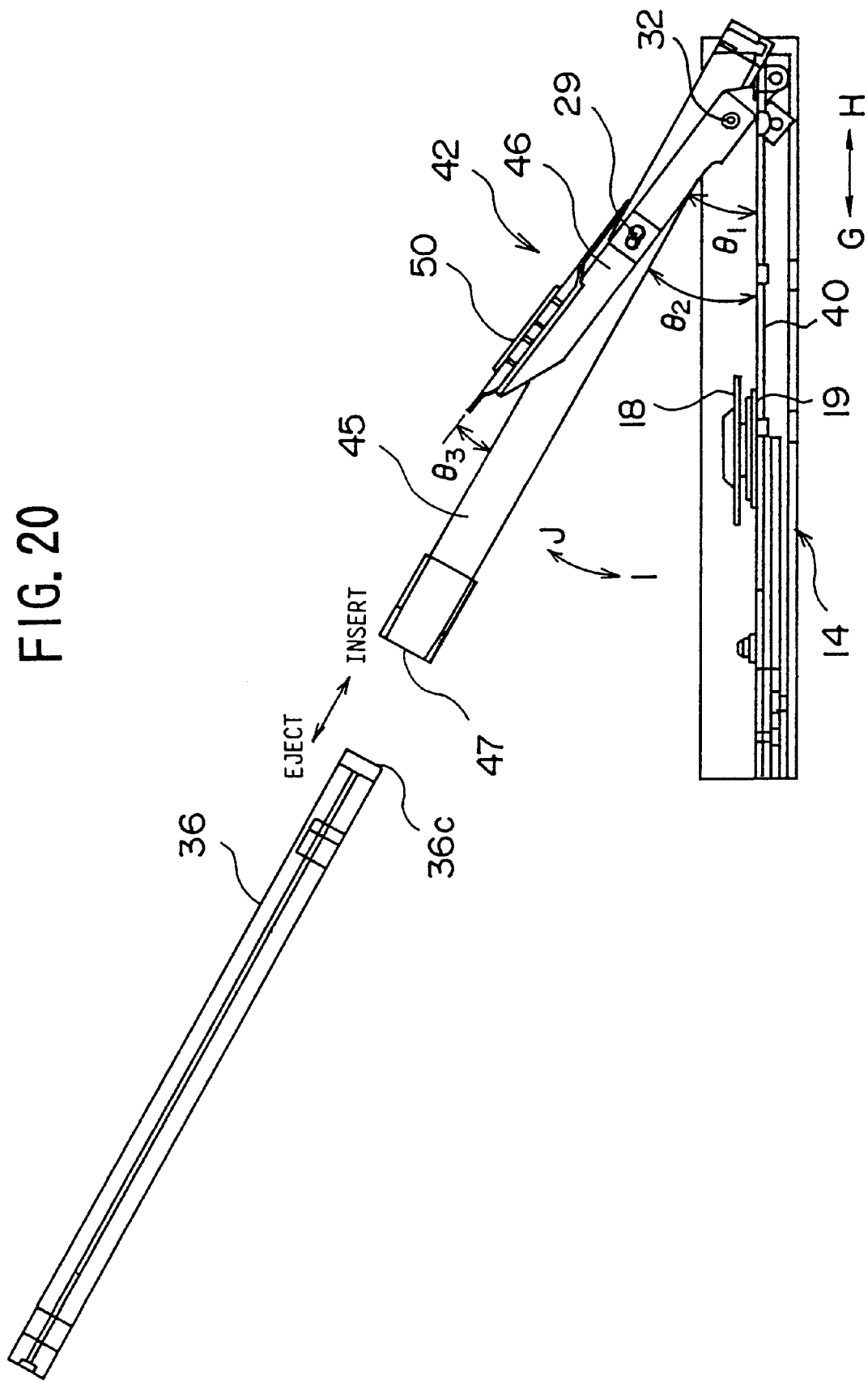
FIG. 20 is a cross-sectional view of the loading apparatus according to the second embodiment in a state in which the holder is rotated to the recording medium inserting/ejecting position, viewed in a front direction.

FIG. 20 is a cross-sectional view of the loading apparatus according to the second embodiment in a state in which the holder 15 is rotated to the recording-medium insertion/ejection position, viewed in a front direction.

As shown in FIG. 20, when the clamper arm 46 rotates the predetermined angle θ1 in the direction J, the holder 45 reaches the recording medium insertion/ejection position in a state in which the holder 45 is slanted the predetermined angle θ2 so that the insertion opening 47 faces upward. At this time, a clamper 50 supported on the damper arm 46 rotates a predetermined angle θ3 from the holder 45 in the direction J and is located at a position separate from the holder 45. Thus, the damper 50 is moved to the position away from the top plate 45a of the holder 45 in the J direction. Accordingly, the damper 50 is located at a position at which the damper 50 does not block the inserting or ejecting operation of the disc 37 or the disc cartridge 36.

Accordingly, the inserting or ejecting operation of the disc 37 or the disc cartridge 36 with respect to the holder 45 which is slanted a predetermined angle can be easily performed, and, thereby, a smooth exchanging operation of the disc 37 or the disc cartridge 36 can be achieved. The disc cartridge 36 is inserted into the holder 45 via the insertion opening 47 in a direction (directions G or H) of movement of the pickup 20, that is, in a direction rotated by 90 degrees with respect to that of the first embodiment. At this time, the disc cartridge 36 is positioned so that a side to which the shutter 36c is provided ahead, and is inserted into the holder 45 in the direction H. Additionally, during a process in which the cartridge 36 is inserted into the holder 45, the shutter 36c of the disc cartridge 36 moves in a direction (direction A) to open the opening 36b by the shutter opening lever 24.

After the disc cartridge 36 is inserted into a cartridge insertion portion 53 in the holder 45 via the insertion opening 47 from the left side of the holder 45 or the disc 37 is placed on a disc placing member 57 in the holder 45, the holder 45 is pushed downwardly. Thereby, the holder 45 rotates about the shafts 59 of the damper arm 46 in the direction I, and also the damper arm 46 rotates about the shafts 62 in the direction I.

Then, the holder 45 moves downward onto the tray 14 and is attracted by the magnet 34, and the damper 50 supported on the damper arm 16 presses the disc 37 against the turntable 18 so as to clamp the disc 37. Thereafter, the tray 14 is pressed in the direction B and is accommodated in the housing 13.

As mentioned above, since the damper 50 is supported by the damper arm 46 which rotatably supports the holder 15, the disc 37 is clamped between the damper 50 and the turntable 18 during the process to accommodate the holder in the tray 14. Accordingly, when the tray 14 reaches the loaded position at which a recording or reproducing operation can be performed, the disc 37 has already been clamped. That is, since the damper 50 is moved upwardly in a state in which the tray 14 is drawn to the exchanging position, there is no need to provide a space for moving the damper 50 up and down in the housing 13. Thus, a thickness of the apparatus can be reduced.

A description will now be given of a third embodiment of the present invention.

Figure 21:
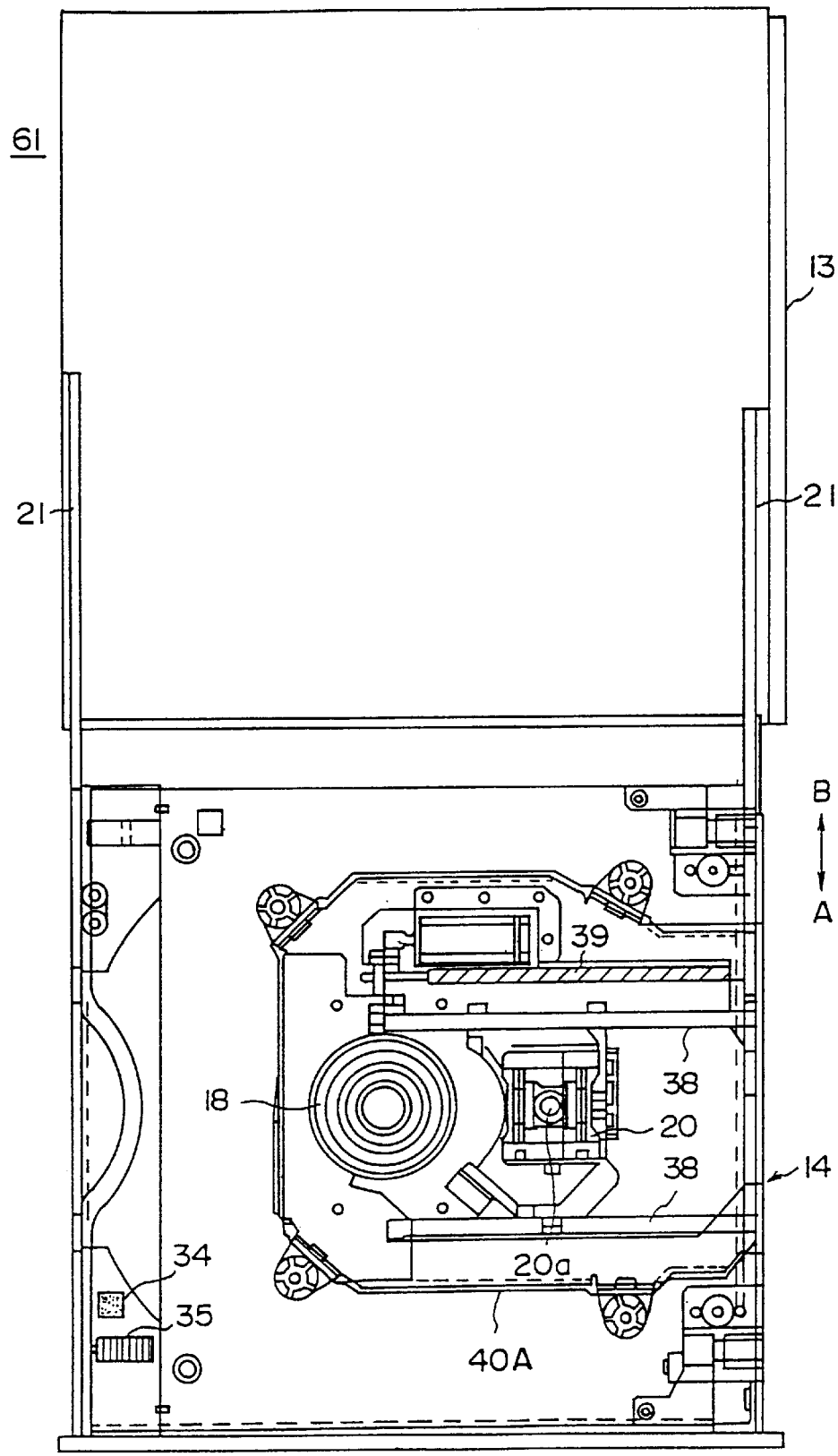
FIG. 21 is a plan view of a loading apparatus according to a third embodiment of the present invention in a state in which a tray is drawn out.
Figure 22:
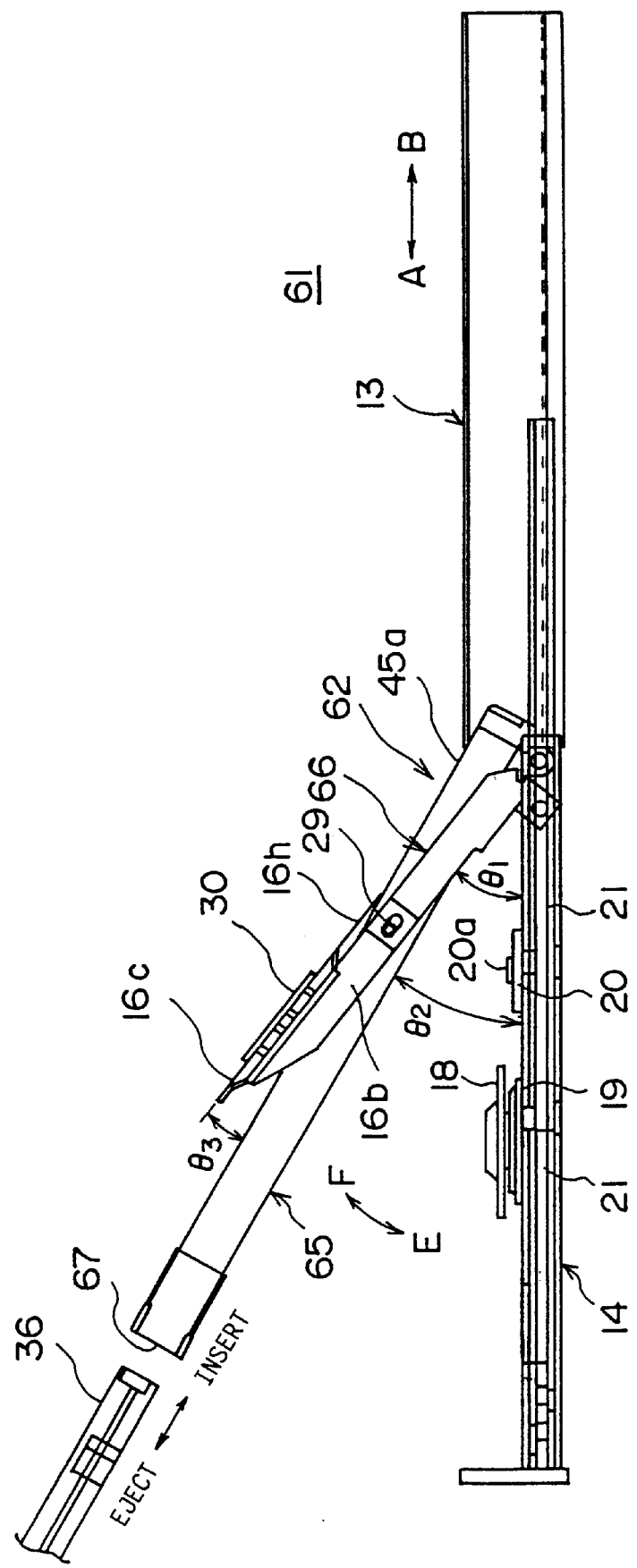
FIG. 22 is a side view of the loading apparatus shown in FIG. 21 in a state in which a holder and a clamper arm are rotated to a recording medium insertion/ejection position.

FIG. 21 is a plan view of a loading apparatus 62 according to the third embodiment of the present invention in a state in which a tray is drawn out. FIG. 22 is a side view of the loading apparatus 62 in a state in which a holder and a clamper arm are rotated to a recording-medium insertion/ejection position. In FIGS. 21 and 22, parts that are the same as the parts of the above-mentioned first embodiment are given the same reference numerals, and descriptions thereof will be omitted.

As shown in FIGS. 21 and 22, in the loading apparatus 62 provided in a disc apparatus 61, a holder 65 and a damper arm 66 are extended in the direction (directions A and B) of movement of the tray 14 similar to the above-mentioned loading apparatus 12. Accordingly, an insertion opening 67 of the holder 65 is positioned on the front side of the tray 14. Thus, the disc cartridge 36 is loaded to the disc apparatus 61 by being inserted into the insertion opening 67 on the front side of the holder 65. That is, the loading apparatus 62 is mounted in a state in which the loading apparatus is positioned in the same directed as that of the loading apparatus 12. Accordingly, the holder 65 and the damper arm 66 are rotatable in the directions E and F which is the same as the directions (directions A and B) of movement of the tray 14.

Similar to the loading apparatus 42 of the above-mentioned second embodiment the sub-chassis 40A is mounted on the top surface of the tray 14, the turntable 18, the disc motor 19 and the pickup 20 being mounted on the sub-chassis 40A. The sub-chassis 40A extends in the directions G and H which are perpendicular to the direction (directions A and B) of movement of the tray 14 in response to a direction of mounting of the holder 65 and the damper arm 66. Accordingly, the pickup 20 is moved in a tracking direction (directions G or H) by being guided by the guide shaft 38 and the lead screw 39, the guide shaft 38 being formed to extend in the directions G and H. Accordingly, the objective lens 20a of the pickup 20 moves a distance corresponding to an amount of rotation of the lead screw 39 being rotated by a pickup drive motor (not shown in the figure).

The disc cartridge 36 is inserted into the insertion opening 67 from a front side of the holder 65 (in the direction B). In this case, the disc cartridge is inserted in a direction corresponding to the direction (directions G or H) of movement of the pickup 20. That is, the disc cartridge 36 is inserted into the holder 65 in the same direction with the opening direction of the shutter 36c while the left side of the disc cartridge 36 is positioned ahead which left side is not provided with the shutter 36c. The shutter 36c of the disc cartridge 36 is moved by the shutter-opening lever 24 in a direction (direction A) to open the opening 36b in a process to insert the disc cartridge 36 into the holder 65.

It should be noted that although the insertion direction of the disc cartridge 36 in the loading apparatus 62 according to the third embodiment is different by 90 degrees from that of the above-mentioned loading apparatus 12, a description thereof will be omitted since operations of the holder 65 and the damper arm 66 is the same as that of the loading apparatus 12.

As mentioned above, in the loading apparatus 62, the disc 37 or the disc cartridge 36 can be performed, and the disc can be clamped in a state in which the tray 14 is drawn to the recording-medium exchanging position. Accordingly, there is no need to provide a space for moving the damper 50 up and down within the housing 13. Thus, a thickness of the apparatus can be decreased.

It should be noted that the present invention is not limited to the above-mentioned embodiments using a CD-ROM and a PD disc cartridge or a DVD disc cartridge, and the present invention is applicable to an apparatus to which a card-like recording medium such as an IC card or a disc-like recording medium such as a magnetic disc, a magneto-optical disc or an optical disc.

The present invention is not limited to the specifically disclosed embodiments, and variations and modifications may be made without departing from the scope of the present invention.

The present application is based on Japanese priority application No.10-012708 filed on Jan. 26, 1998, the entire contents of which are hereby incorporated by reference.

What is claimed is:

1. A recording-medium loading apparatus for loading a recording medium into a recording and/or reproducing apparatus, comprising:

a tray movable between an exchanging position at which said recording medium is removed or inserted and a loaded position at which a recording or reproducing operations performed on said recording medium;

a holder holding said recording medium;

a support member movably supporting said holder so that said holder is movable between an accommodating position at which said holder is accommodated in said tray and an insertion/ejection position at which said holder is accommodated in said tray and an insertion/ejection position at which said holder is separated from said tray;

wherein said holder is movable to said insertion/ejection position when said tray is moved to said exchanging position, and said holder is held at said accommodating position during a process for moving said tray to said loaded position, said tray being positioned at one of said exchanging position and said loaded position by being moved straight, said holder being positioned at one of said accommodating position and said insertion/ejection position by being rotated with respect to said tray, and said holder being rotatably supported with respect to said support member;

a turntable provided on said tray so as to rotate said recording medium; and a clamper arranged in said loading apparatus for clamping said recording medium between said clamper and said turntable when said holder is moved to said accommodating position, wherein said clamper is supported by a clamper supporting member, and an angle of rotation of said clamper supporting member is larger than an angle of rotation of said supporting member when said tray is at said exchanging position.

2. The recording-medium loading apparatus as claimed in claim 1, wherein when said holder is moved to said insertion/ejection position, a slanting angle of said support member with respect said tray is greater than a slanting angle of said holder with respect to said tray, said clamper being provided on an end of said support member opposite to a center of rotation of said support member so that said clamper is separated from said holder.

3. The recording-medium loading apparatus as claimed in claim 1, wherein said holder has a first end and a second end opposite to said first end, said first end having an opening through which said recording medium is inserted into said holder, said holder being slanted with respect to said tray by said second end being prevented from moving relative to said tray and said first end being moved away from said tray.

4. The recording-medium loading apparatus as claimed in claim 3, wherein said holder is provided on said tray so that said first end and said second end are arranged along a direction of movement of said tray.

5. The recording-medium loading apparatus as claimed in claim 3, wherein said holder is provided on said tray so that said first end and said second end are aligned along a direction perpendicular to a direction of movement of said tray.

6. The recording-medium loading apparatus as claimed in claim 1, wherein said damper is provided on said supporting member.

7. The recording-medium loading apparatus as claimed in claim 1, wherein said holder is adapted to support a cartridge accommodating a recording medium therein, and said holder is also adapted to support a recording medium lacking a cartridge.

* * * * *